US010598827B2

(12) United States Patent
Baek et al.

(10) Patent No.: US 10,598,827 B2
(45) Date of Patent: Mar. 24, 2020

(54) PROTECTION FILM STRUCTURE AND PROTECTION FILM ATTACHMENT-ASSISTING STRUCTURE

(71) Applicants: Sing Je Baek, Gyeongsan-si (KR); Seung Ho Baek, Gyeongsan-si (KR)

(72) Inventors: Sing Je Baek, Gyeongsan-si (KR); Seung Ho Baek, Gyeongsan-si (KR)

(*) Notice: Subject to any disclaimer, the term of this patent is extended or adjusted under 35 U.S.C. 154(b) by 130 days.

(21) Appl. No.: 15/765,492

(22) PCT Filed: Sep. 20, 2016

(86) PCT No.: PCT/KR2016/010471
§ 371 (c)(1),
(2) Date: Apr. 3, 2018

(87) PCT Pub. No.: WO2017/061718
PCT Pub. Date: Apr. 13, 2017

(65) Prior Publication Data
US 2019/0072692 A1 Mar. 7, 2019

(30) Foreign Application Priority Data

Oct. 8, 2015 (KR) .................. 10-2015-0141263
Jun. 2, 2016 (KR) .................. 10-2016-0068748

(51) Int. Cl.
*C09J 7/29* (2018.01)
*G02F 1/1333* (2006.01)
(Continued)

(52) U.S. Cl.
CPC .............. *G02B 1/14* (2015.01); *B29C 63/02* (2013.01); *B32B 3/14* (2013.01); *B32B 7/12* (2013.01);
(Continued)

(58) Field of Classification Search
CPC .... G02B 1/14; B32B 7/12; B32B 7/06; B32B 7/29; B32B 3/04; B32B 38/18;
(Continued)

(56) References Cited

U.S. PATENT DOCUMENTS 9,662,860 B2 * 5/2017 Wadsworth ........... B29C 66/861
9,757,934 B2 * 9/2017 Wadsworth ............. B32B 37/26
(Continued)

FOREIGN PATENT DOCUMENTS

KR   1020060022952 A   3/2006
KR   1020060088089 A   8/2006
(Continued)

OTHER PUBLICATIONS

International Search Report of PCT/KR2016/010471, dated Jan. 3, 2017, English translation.

*Primary Examiner* — Patricia L. Nordmeyer
(74) *Attorney, Agent, or Firm* — STIP Law Group, LLC

(57) ABSTRACT

The present invention relates to a protection film structure and a protection film attachment-assisting structure, and more particularly, to a protection film structure and a protection film attachment-assisting structure for easily attaching a protection film to an accurate position on a smart device such as a smartphone or a tablet personal computer (PC) without introduction of dust.

12 Claims, 10 Drawing Sheets

(51) Int. Cl.
*B29C 63/02* (2006.01)
*B32B 38/18* (2006.01)
*B32B 7/12* (2006.01)
*G02B 1/14* (2015.01)
*G06F 3/041* (2006.01)
*B32B 41/00* (2006.01)
*B32B 3/14* (2006.01)
*G06F 1/16* (2006.01)
*H04M 1/18* (2006.01)
*B29L 31/34* (2006.01)
*B29C 63/00* (2006.01)
*B32B 38/10* (2006.01)

(52) U.S. Cl.
CPC ............ *B32B 38/18* (2013.01); *B32B 41/00* (2013.01); *C09J 7/29* (2018.01); *G02F 1/133308* (2013.01); *G06F 1/1626* (2013.01); *G06F 3/041* (2013.01); *B29C 63/0056* (2013.01); *B29L 2031/3475* (2013.01); *B32B 38/10* (2013.01); *B32B 38/1833* (2013.01); *B32B 2309/65* (2013.01); *B32B 2457/20* (2013.01); *C09J 2203/318* (2013.01); *G02F 1/13338* (2013.01); *G02F 2001/133311* (2013.01); *G02F 2201/50* (2013.01); *G06F 2200/1634* (2013.01); *G06F 2203/04107* (2013.01); *H04M 1/185* (2013.01)

(58) Field of Classification Search
CPC ..... B32B 41/00; B32B 38/10; B32B 38/1833; B32B 2309/65; B32B 2457/20; G06F 1/1626; G06F 3/041; G06F 2200/1634; G06F 2203/04107; G06F 1/133308; Y10T 428/14; Y10T 428/1476; Y10T 428/192; B29C 63/0095; B29C 63/02; B29C 2063/0008; B29C 63/0056; C09J 7/29; C09J 2203/318; H04M 1/185; G02F 1/13338; G02F 2001/133311; G02F 2201/50; B29L 2031/3475
See application file for complete search history.

(56) References Cited

U.S. PATENT DOCUMENTS 9,777,195 B2 * 10/2017 Colby ............... B29C 63/02
2013/0171400 A1 * 7/2013 Lin ............... B29C 63/0095
428/41.8

FOREIGN PATENT DOCUMENTS

| KR | 1020120051325 A | 5/2012 |
| KR | 1020140004440 A | 1/2014 |
| KR | 1020140147515 A | 12/2014 |

* cited by examiner

PROTECTION FILM STRUCTURE AND PROTECTION FILM ATTACHMENT-ASSISTING STRUCTURE

CROSS-REFERENCE TO RELATED APPLICATIONS

This application is the U.S. National Phase under 35 U.S.C. § 371 of International Application No. PCT/KR2016/010471 filed on Sep. 20, 2016, which in turn claims the benefit of Korean Applications No. 10-2015-0141263 filed on Oct. 8, 2015 and No. 10-2016-0068748 filed on Jun. 2, 2016, the disclosures of which are incorporated by reference into the present application.

TECHNICAL FIELD

The present invention relates to a protection film structure and a protection film attachment-assisting structure, and more particularly, to a protection film structure and a protection film attachment-assisting structure for easily attaching a protection film to an accurate position on a smart device such as a smartphone or a tablet personal computer (PC) without introduction of dust.

BACKGROUND ART

As touch screen smartphones and tablet personal computers (PCs) become common, protection films have been generally used on screen portions (touch screen display portions) of smartphones and tablet PCs.

It is preferable that the protection film is made of a transparent material resistant to a scratch and having excellent static electricity preventing characteristics. The protection film may include, for example, poly ethylene terephthlate (PET), temperature polyurethane (TPU), or the like. In the case in which PET is used as a material of the protection film, low reflection optical PET is used. The low reflection optical PET has light reflectivity lower than that of general PET to secure better visibility of a screen. The protection film may include oriented polypropylene (OPP), polyester, nylon, or the like, in addition to the material described above. Recently, tempered glass is also used as the material of the protection film.

The largest problem in attaching the protection film to the screen portion is introduction of dust. In detail, the dust is introduced onto an adhesion surface or the screen portion due to surface static electricity. In addition, it is not easy to attach the protection film to an accurate position.

Various inventions have been made in order to facilitate the attachment of the protection film, and examples of these inventions are disclosed in Patent Document 1 {Korean Patent Laid-Open Publication No. 10-2014-0147515A (published on Dec. 30, 2014)} and Patent Document 2 {Korean Patent Laid-Open Publication No. 10-2006-0022952A (published on Mar. 13, 2006)}.

However, even in inventions of Patent Document 1 and Patent Document 2, it is difficult to attach the protection film to the accurate position without the introduction of the dust.

DISCLOSURE

Technical Problem

The present invention has been made in order to solve the problems described above, and an object of the present invention is to easily attach a protection film to an accurate position on a smart device such as a smartphone or a tablet personal computer (PC) without introduction of dust.

Technical Solution

According to an exemplary embodiment of the present invention, a protection film structure may include: a protection film attached to a screen portion of a smart device; a first auxiliary film in contact with a lower portion of the protection film; and a second auxiliary film in contact with a lower portion of the first auxiliary film, wherein the first auxiliary film is in a state in which a 1-1-th auxiliary film and a 1-2-th auxiliary film are connected to and overlapped with each other, the second auxiliary film is in a state in which a 2-1-th auxiliary film and a 2-2-th auxiliary film are connected to and overlapped with each other, the protection film is in contact with the 1-1-th auxiliary film, the 1-2-th auxiliary film is in contact with the 2-1-th auxiliary film, a protection film adhesive material is applied to a surface of the protection film in contact with the 1-1-th auxiliary film, a first adhesive material is applied between the 1-2-th auxiliary film and the 2-1-th auxiliary film, a second adhesive material is applied to a surface of the 2-2-th auxiliary film opposing a surface of the 2-2-th auxiliary film facing the 2-1-th auxiliary film, a knob portion is formed at an end portion of the 1-2-th auxiliary film, a knob portion is formed at an end portion of the 2-1-th auxiliary film, or knob portions are formed at both of the end portion of the 1-2-th auxiliary film and the end portion of the 2-1-th auxiliary film, and when the knob portion is pulled in a state in which the 2-2-th auxiliary film is attached to the screen portion of the smart device, the protection film is attached to the screen portion while the 2-2-th auxiliary film being released.

A third adhesive material may be applied to a surface of the 1-1-th auxiliary film in contact with the protection film, and adhesion of the third adhesive material may be stronger than that of the protection film adhesive material.

Release films may be attached to both sides of the protection film structure.

Lubricating materials may be applied between the 1-1-th auxiliary film and the 1-2-th auxiliary film and between the 2-1-th auxiliary film and the 2-2-th auxiliary film.

Edges of the 1-1-th auxiliary film and edges of the 2-2-th auxiliary film may be bonded to each other, and the edges bonded to each other may be edges formed in parallel with a direction in which the knob portion is pulled among edges of the 1-1-th auxiliary film and the 2-2-th auxiliary film.

According to another exemplary embodiment of the present invention, a protection film attachment-assisting structure may include: a first auxiliary film; and a second auxiliary film in contact with a lower portion of the first auxiliary film, wherein the first auxiliary film is in a state in which a 1-1-th auxiliary film and a 1-2-th auxiliary film are connected to and overlapped with each other, the second auxiliary film is in a state in which a 2-1-th auxiliary film and a 2-2-th auxiliary film are connected to and overlapped with each other, the 1-2-th auxiliary film is in contact with the 2-1-th auxiliary film, a first adhesive material is applied between the 1-2-th auxiliary film and the 2-1-th auxiliary film, a second adhesive material is applied to a surface of the 2-2-th auxiliary film opposing a surface of the 2-2-th auxiliary film facing the 2-1-th auxiliary film, a knob portion is formed at an end portion of the 1-2-th auxiliary film, a knob portion is formed at an end portion of the 2-1-th auxiliary film, or knob portions are formed at both of the end portion of the 1-2-th auxiliary film and the end portion of the 2-1-th auxiliary film, and when the knob portions are pulled in a state in which the 1-1-th auxiliary film is attached to a protection film and the 2-2-th auxiliary film is attached to a screen portion of a smart device, the protection film is attached to the screen portion while the 1-1-th auxiliary film and the 2-2-th auxiliary film being released.

A third adhesive material is applied may be a surface of the 1-1-th auxiliary film in contact with the protection film, and adhesion of the third adhesive material may be stronger than that of an adhesive material applied to the protection film.

Release films may be attached to both sides of the protection film attachment-assisting structure.

Lubricating materials may be applied between the 1-1-th auxiliary film and the 1-2-th auxiliary film and between the 2-1-th auxiliary film and the 2-2-th auxiliary film.

Edges of the 1-1-th auxiliary film and edges of the 2-2-th auxiliary film may be bonded to each other, and the edges bonded to each other may be edges formed in parallel with a direction in which the knob portion is pulled among edges of the 1-1-th auxiliary film and the 2-2-th auxiliary film.

According to still another exemplary embodiment of the present invention, a protection film structure may include: a protection film attached to a screen portion of a smart device; and an auxiliary film in contact with a lower portion of the protection film, wherein the auxiliary film is in a state in which an upper auxiliary film and a lower auxiliary film are connected to and overlapped with each other, the protection film is in contact with the upper auxiliary film, a protection film adhesive material is applied to a surface of the protection film in contact with the upper auxiliary film, a lower adhesive material is applied to a surface of the lower auxiliary film opposing a surface of the lower auxiliary film facing the upper auxiliary film, an M-shaped wrinkle is formed at a portion at which the upper auxiliary film and the lower auxiliary film are connected to each other, and a pulling rod of a pulling member is attached to a central portion of the M-shaped wrinkle, the pulling member includes the pulling rod and a pulling connection portion, the pulling connection portion is connected to the pulling rod, and a pulling member knob portion is formed at the other end portion of the pulling connection portion, and when the pulling member knob portion is pulled in a state in which the lower auxiliary film is attached to the screen portion of the smart device, the protection film is attached to the screen portion simultaneously with the release of the lower auxiliary film while the M-shaped wrinkle being deepened.

An upper adhesive material may be applied to a surface of the upper auxiliary film in contact with the protection film, and adhesion of the upper adhesive material may be stronger than that of the protection film adhesive material.

Release films may be attached to both sides of the protection film structure.

A lubricating material may be applied between the upper auxiliary film and the lower auxiliary film.

Edges of the upper auxiliary film and edges of the lower auxiliary film may be bonded to each other, and the edges bonded to each other may be edges formed in parallel with a direction in which the pulling member knob portion is pulled among edges of the upper auxiliary film and the lower auxiliary film.

The pulling member may have a T shape.

According to yet still another exemplary embodiment of the present invention, a protection film attachment-assisting structure may include: an upper auxiliary film and a lower auxiliary film connected to and overlapped with each other, wherein a lower adhesive material is applied to a surface of the lower auxiliary film opposing a surface of the lower auxiliary film facing the upper auxiliary film, an M-shaped wrinkle is formed at a portion at which the upper auxiliary film and the lower auxiliary film are connected to each other, and a pulling rod of a pulling member is attached to a central portion of the M-shaped wrinkle, the pulling member includes the pulling rod and a pulling connection portion, the pulling connection portion is connected to the pulling rod, and a pulling member knob portion is formed at the other end portion of the pulling connection portion, and when the pulling member knob portion is pulled in a state in which the upper auxiliary film is attached to a protection film and the lower auxiliary film is attached to a screen portion of a smart device, the protection film is attached to the screen portion simultaneously with the release of the upper auxiliary film and the lower auxiliary film while the M-shaped wrinkle being deepened.

An upper adhesive material may be applied to a surface of the upper auxiliary film in contact with the protection film, and adhesion of the upper adhesive material may be stronger than that of an adhesive material applied to the protection film.

Release films may be attached to both sides of the protection film attachment-assisting structure.

A lubricating material may be applied between the upper auxiliary film and the lower auxiliary film.

Edges of the upper auxiliary film and edges of the lower auxiliary film may be bonded to each other, and the edges bonded to each other may be edges formed in parallel with a direction in which the pulling member knob portion is pulled among edges of the upper auxiliary film and the lower auxiliary film.

The pulling member may have a T shape.

According to yet still another exemplary embodiment of the present invention, a protection film structure may include: a protection film attached to a screen portion of a smart device; and an auxiliary film in contact with a lower portion of the protection film, wherein the auxiliary film includes an upper auxiliary film, a lower auxiliary film, and a pulling member positioned between the upper auxiliary film and the lower auxiliary film, one end of the upper auxiliary film, one end of the pulling member, and one end of the lower auxiliary film are sequentially overlapped with each other and are then adhered and connected to each other, a pulling member knob portion is formed at the other end portion of the pulling member and is able to be pulled, the protection film is in contact with the upper auxiliary film, a protection film adhesive material is applied to a surface of the protection film in contact with the upper auxiliary film, a lower adhesive material is applied to a surface of the lower auxiliary film opposing a surface of the lower auxiliary film facing the upper auxiliary film, and when the pulling member knob portion is pulled in a state in which the lower auxiliary film is attached to the screen portion of the smart device, the protection film is attached to the screen portion simultaneously with the release of the lower auxiliary film while portions at which the upper auxiliary film and the lower auxiliary film are bonded and connected to each other being rolled in between the upper auxiliary film and the lower auxiliary film.

An upper adhesive material may be applied to a surface of the upper auxiliary film in contact with the protection film, and adhesion of the upper adhesive material may be stronger than that of the protection film adhesive material.

The protection film structure may further include a first position aligning film and a second position aligning film attached to the lower auxiliary film, wherein the first position aligning film is attached to an end portion of the lower auxiliary film at a predetermined area, and an attached portion of the first position aligning film is positioned at a portion corresponding to a portion at which the upper auxiliary film and the lower auxiliary film are connected to each other, the second position aligning film includes an upper position aligning film and a lower position aligning film, the upper position aligning film and the lower position aligning film are connected to each other, the upper position aligning film is attached to the lower auxiliary film so that a connection portion between the upper position aligning film and the lower position aligning film becomes a position in contact with the first position aligning film, and a lower position aligning film knob portion is formed in the lower position aligning film, and in the case in which it is assumed that a surface of the lower auxiliary film adhered to the first position aligning film is a first adhesion surface and a surface of the lower auxiliary film adhered to the second position aligning film is a second adhesion surface, when the lower position aligning film knob portion is pulled in a state in which the first adhesion surface of the lower auxiliary film is attached to the screen portion of the smart device, the upper position aligning film is released from the lower auxiliary film.

Portions of edges of each of the upper auxiliary film and the lower auxiliary film formed in parallel with a direction in which the pulling member knob portion is pulled among edges of the upper auxiliary film and edges of the lower auxiliary film may be bonded to each other.

A first position aligning film knob portion may be formed in the first position aligning film.

According to yet still another exemplary embodiment of the present invention, a protection film attachment-assisting structure may include: an upper auxiliary film; a lower auxiliary film; and a pulling member positioned between the upper auxiliary film and the lower auxiliary film, wherein one end of the upper auxiliary film, one end of the pulling member, and one end of the lower auxiliary film are sequentially overlapped with each other and are then adhered and connected to each other, a pulling member knob portion is formed at the other end portion of the pulling member and is able to be pulled, a lower adhesive material is applied to a surface of the lower auxiliary film opposing a surface of the lower auxiliary film facing the upper auxiliary film, and when the pulling member knob portion is pulled in a state in which the upper auxiliary film is attached to a protection film and the lower auxiliary film is attached to a screen portion of a smart device, the protection film is attached to the screen portion simultaneously with the release of the lower auxiliary film while portions at which the upper auxiliary film and the lower auxiliary film are bonded and connected to each other being rolled in between the upper auxiliary film and the lower auxiliary film.

An upper adhesive material may be applied to a surface of the upper auxiliary film in contact with the protection film, and adhesion of the upper adhesive material may be stronger than that of an adhesive material applied to the protection film.

The protection film attachment-assisting structure may further include a first position aligning film and a second position aligning film attached to the lower auxiliary film, wherein the first position aligning film is attached to an end portion of the lower auxiliary film at a predetermined area, and an attached portion of the first position aligning film is positioned at a portion corresponding to a portion at which the upper auxiliary film and the lower auxiliary film are connected to each other, the second position aligning film includes an upper position aligning film and a lower position aligning film, the upper position aligning film and the lower position aligning film are connected to each other, the upper position aligning film is attached to the lower auxiliary film so that a connection portion between the upper position aligning film and the lower position aligning film becomes a position in contact with the first position aligning film, and a lower position aligning film knob portion is formed in the lower position aligning film, and in the case in which it is assumed that a surface of the lower auxiliary film adhered to the first position aligning film is a first adhesion surface and a surface of the lower auxiliary film adhered to the second position aligning film is a second adhesion surface, when the lower position aligning film knob portion is pulled in a state in which the first adhesion surface of the lower auxiliary film is attached to the screen portion of the smart device, the upper position aligning film is released from the lower auxiliary film.

Portions of edges of each of the upper auxiliary film and the lower auxiliary film formed in parallel with a direction in which the pulling member knob portion is pulled among edges of the upper auxiliary film and edges of the lower auxiliary film may be bonded to each other.

A release film may be attached to the upper auxiliary film.

A release film knob portion may be formed in the release film.

A first position aligning film knob portion may be formed in the first position aligning film.

Advantageous Effects

In the present invention, it is possible to attach a protection film to an accurate position on a smart device such as a smartphone or a tablet personal computer (PC) without introduction of dust.

DETAILED DESCRIPTION OF MAIN ELEMENTS

Figure 1:
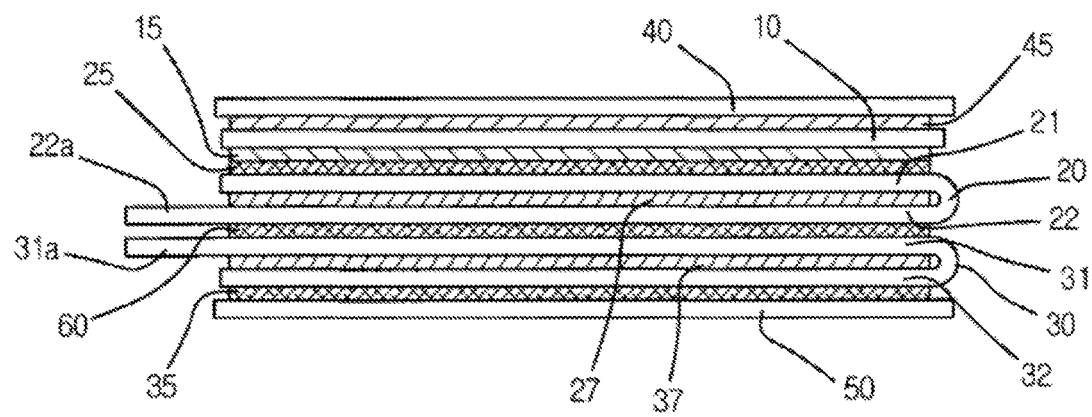
FIG. 1 is a vertical cross-sectional view of a protection film structure according to a first exemplary embodiment.

10: protection film
15: protection film adhesive material
20: first auxiliary film
21: 1-1-th auxiliary film
22: 1-2-th auxiliary film
22*a*: 1-2-th auxiliary film knob portion
25: third adhesive material
27: first lubricating material
30: second auxiliary film
31: 2-1-th auxiliary film
31*a*: 2-1-th auxiliary film knob portion
32: 2-2-th auxiliary film
35: second adhesive material
37: second lubricating material
40: first release film
45: fourth adhesive material
50: second release film
60: first adhesive material
90: smart device
91: screen portion
110: protection film
115: protection film adhesive material
125: upper adhesive material
130: auxiliary film
130*a*: auxiliary film hole
131: upper auxiliary film
132: lower auxiliary film
135: lower adhesive material
140: upper release film
145: upper release film adhesive material
150: lower release film
170: pulling member
171: pulling rod
172: pulling connection portion
172*a*: pulling member knob portion
210: protection film
215: protection film adhesive material
225: upper adhesive material
235: lower adhesive material
231: upper auxiliary film
232: lower auxiliary film
240: upper release film
270: pulling member
271: pulling member adhesion portion
272*a*: pulling member knob portion
280: first position aligning film
280*a*: first position aligning film knob portion
290: second position aligning film
291: upper position aligning film
292: lower position aligning film
292*a*: lower position aligning film knob portion

BEST MODE

Since the present invention may be variously modified and have several exemplary embodiments, specific exemplary embodiments will be illustrated in the accompanying drawings and be described in detail in a detailed description. However, it is to be understood that the present invention is not limited to a specific exemplary embodiment, but includes all modifications, equivalents, and substitutions without departing from the scope and spirit of the present invention. When it is determined that a detailed description for any known art related to the present invention may obscure the gist of the present invention, the detailed description will be omitted.

Terms used in the present specification are used only in order to describe specific exemplary embodiments rather than limiting the present invention. Singular forms are intended to include plural forms unless the context clearly indicates otherwise.

In the present specification, a protection film means a film attached to a smartphone, a smart pad, or the like, in order to protect a liquid crystal screen of the smartphone, the smart pad, or the like. Therefore, a material of the protection film is not limited to poly ethylene terephthlate (PET), temperature polyurethane (TPU), or the like, but may also be tempered glass, or the like.

Hereinafter, the present invention will be described in more detail with reference to the accompanying drawings.

First Exemplary Embodiment

Figure 2:
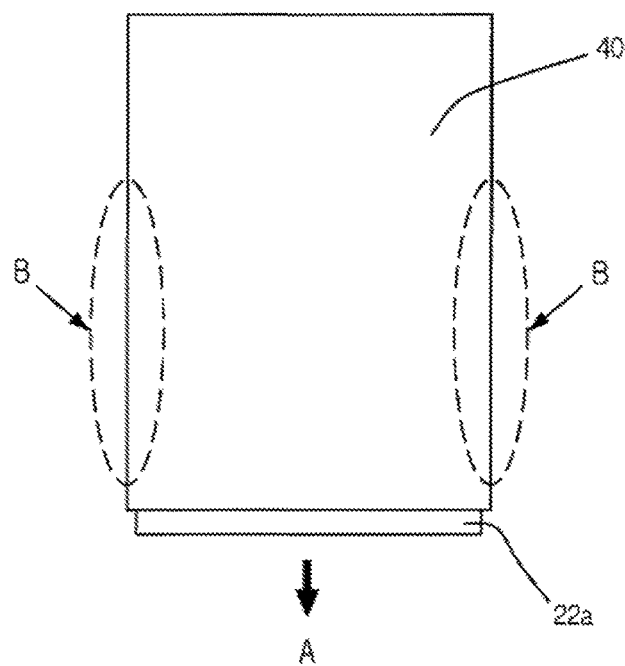
FIG. 2 is a plan view of the protection film structure according to the first exemplary embodiment.

FIG. 1 is a vertical cross-sectional view of a protection film structure according to a first exemplary embodiment, and FIG. 2 is a plan view of the protection film structure according to the first exemplary embodiment.

The protection film structure according to the first exemplary embodiment includes a first release film 40, a protection film 10, a first auxiliary film 20 in contact with a lower portion of the protection film, a second auxiliary film 30 in contact with a lower portion of the first auxiliary film, and a second release film 50.

The first auxiliary film 20 is in a state in which a 1-1-th auxiliary film 21 and a 1-2-th auxiliary film 22 are connected to and overlapped with each other, and the second auxiliary film 30 is in a state in which a 2-1-th auxiliary film and a 2-2-th auxiliary film 32 are connected to and overlapped with each other.

In FIG. 1, the first released film 40, the protection film 10, the 1-1-th auxiliary film 21, the 1-2-th auxiliary film 22, the 2-1-th auxiliary film 31, the 2-2-th auxiliary film 32, the second release film 50 are sequentially stacked while being in contact with each other.

A fourth adhesive material 45 is applied to a lower portion of the first release film 40, a protection film adhesive material 15 is applied to the lower portion of the protection film 10, and a third adhesive material 25 is applied to an upper portion of the 1-1-th auxiliary film 21.

A first adhesive material 60 is applied between the 1-2-th auxiliary film 22 and the 2-1-th auxiliary film 31, and a second adhesive material 35 is applied to a lower portion of the 2-2-th auxiliary film 32.

A first lubricating material 27 is applied between the 1-1-th auxiliary film 21 and the 1-2-th auxiliary film 22, and a second lubricating material 37 is applied between the 2-1-th auxiliary film 31 and the 2-2-th auxiliary film 32. The first lubricating material 27 is to decrease friction between the 1-1-th auxiliary film 21 and the 1-2-th auxiliary film 22 to allow the 1-1-th auxiliary film 21 and the 1-2-th auxiliary film 22 to be easily slid. The second lubricating material 37 is to decrease friction between the 2-1-th auxiliary film 31 and the 2-2-th auxiliary film 32 to allow the 2-1-th auxiliary film 31 and the 2-2-th auxiliary film 32 to be easily slid.

A 1-2-th auxiliary film knob portion 22a is formed at an end portion of the 1-2-th auxiliary film 22, and a 2-1-th auxiliary film knob portion 31a is formed at an end portion of the 2-1-th auxiliary film 31.

One of the 1-2-th auxiliary film knob portion 22a and the 2-1-th auxiliary film knob portion 31a may also be omitted.

The 1-2-th auxiliary film knob portion 22a and the 2-1-th auxiliary film knob portion 31a are portions held by a user's hand when they are pulled in direction A of FIG. 2.

It is preferable that edges of the 1-1-th auxiliary film 21 and edges of the 2-2-th auxiliary film 32 are bonded to each other. When the edges of the 1-1-th auxiliary film 21 and the edges of the 2-2-th auxiliary film 32 are bonded to each other, there are the following two advantages. First, relative positions of the 1-1-th auxiliary film 21 and the 2-2-th auxiliary film 32 are fixed. Second, when the knob portion (the 1-2-th auxiliary film knob portion 22a or the 2-1-th auxiliary film knob portion 31a) is pulled in direction A, the 1-2-th auxiliary film 22 and the 2-1-th auxiliary film 31 may not go out of bonded portions between the edges, and the knob portion may thus be pulled in a constant direction.

The edges of the 1-1-th auxiliary film 21 and the edges of the 2-2-th auxiliary film 32 may be bonded to each other using an adhesive or may be bonded to each other by applying heat to the edges of the 1-1-th auxiliary film 21 and the edges of the 2-2-th auxiliary film 32 to melt the edges of the 1-1-th auxiliary film 21 and the edges of the 2-2-th auxiliary film 32. The edges of the 1-1-th auxiliary film 21 and the edges of the 2-2-th auxiliary film 32 may be bonded to each other by various methods other than the methods described above.

Even though the edges of the 1-1-th auxiliary film 21 and the edges of the 2-2-th auxiliary film 32 are bonded to each other, it is preferable that only two edges of each of the 1-1-th auxiliary film 21 and the 2-2-th auxiliary film 32 formed in parallel with a direction in which the knob portion is pulled among four edges of each of the 1-1-th auxiliary film 21 and the 2-2-th auxiliary film 32 are bonded to each other in order not to hinder the knob portion (the 1-2-th auxiliary film knob portion 22a or the 2-1-th auxiliary film knob portion 31a) from being pulled in direction A. When only edges of parts B of FIG. 2 are bonded to each other, it does not hinder the knob portion (the 1-2-th auxiliary film knob portion 22a or the 2-1-th auxiliary film knob portion 31a) from being pulled in direction A.

In addition, since the bonding is weak, when the knob portion (the 1-2-th auxiliary film knob portion 22a or the 2-1-th auxiliary film knob portion 31a) is continuously pulled in direction A, the bonding (bonding between the edges of the 1-1-th auxiliary film 21 and the edges of the 2-2-th auxiliary film 32) is released.

In addition, it is preferable that the two edges formed in parallel with the direction in which the knob portion is pulled are not entirely bonded to each other, but portions of the edges that start to be rolled in (portions that start to be rolled in when the knob portion is pulled, that is, upper portions of the two edges (left and right edges) in FIG. 2) are not bonded to each other. This is so as not to hinder the portions of the edges from being rolled in when the portions of the edges start to be rolled in by pulling the knob portion. That is, it is preferable that portions positioned on an opposite side to the knob portion, of the two edges formed in parallel with the direction in which the knob portion is pulled are not bonded to each other by a predetermined length.

Figure 3:
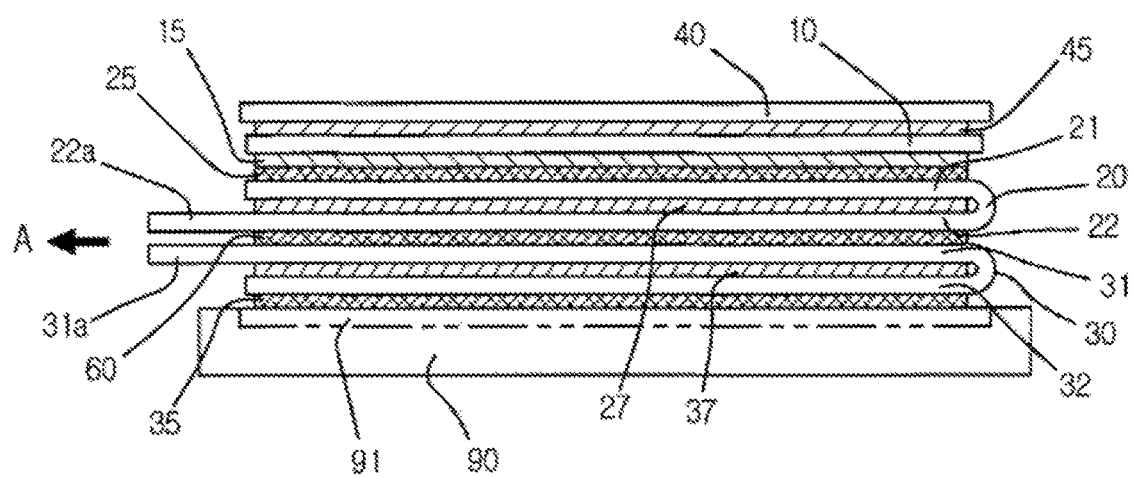
FIG. 3 is a first reference drawing of the first exemplary embodiment.
Figure 4:
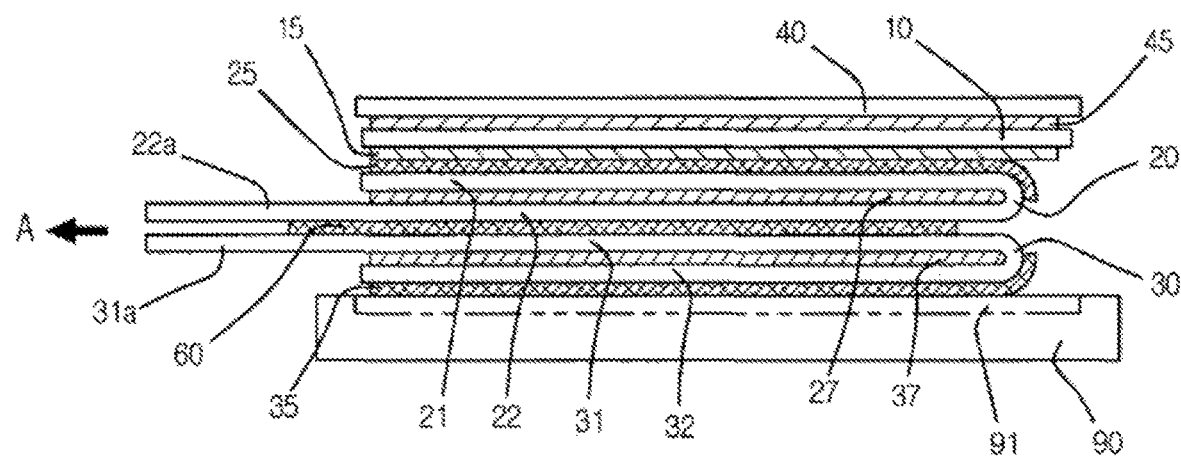
FIG. 4 is a second reference drawing of the first exemplary embodiment.
Figure 5:
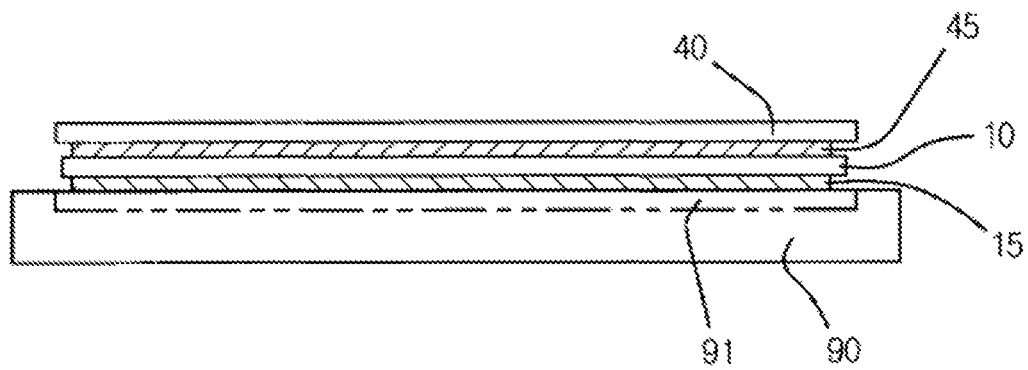
FIG. 5 is a third reference drawing of the first exemplary embodiment.

FIG. 3 is a first reference drawing of the first exemplary embodiment, FIG. 4 is a second reference drawing of the first exemplary embodiment, and FIG. 5 is a third reference drawing of the first exemplary embodiment. Hereinafter, a method of using the protection film structure according to the first exemplary embodiment will be described with reference to FIGS. 3 to 5.

In order to use the protection film structure according to the first exemplary embodiment, first, the second release film 50 is removed, and the remaining portion of the protection film structure is then attached to a screen portion 91 of a smart device 90 (for example, a smartphone).

FIG. 3 illustrates a form in which the second release film 50 is removed and the remaining portion of the protection film structure is then attached to the screen portion 91 of the smart device 90.

In a state of FIG. 3, when the knob portions (the 1-2-th auxiliary film knob portion 22a and the 2-1-th auxiliary film knob portion 31a) are pulled in direction A while the protection film structure being weakly pressed from above, the state of FIG. 3 is changed into a state as illustrated in FIG. 4.

In FIG. 4, when the protection film 10 is closely adhered to the screen portion 91 and the knob portions (the 1-2-th auxiliary film knob portion 22a and the 2-1-th auxiliary film knob portion 31a) are then pulled in direction A while the protection film structure being pressed from above, the first auxiliary film 20 and the second auxiliary film 30 are completely removed, and the state of FIG. 4 is changed into a state as illustrated in FIG. 5.

In the states of FIGS. 3 and 4, when the knob portions (the 1-2-th auxiliary film knob portion 22a and the 2-1-th auxiliary film knob portion 31a) are pulled in direction A, it is preferable to pull the knob portions (the 1-2-th auxiliary film knob portion 22a and the 2-1-th auxiliary film knob portion 31a) while slightly pressing the protection film structure toward the screen portion 91.

In the state of FIG. 4, it is preferable to bring an end portion of the protection film 10 into contact with an end portion of the screen portion 91 so as to coincide with the end portion of the screen portion 91 and then closely adhere the protection film 10 to the screen portion 91 while removing air bubbles.

In FIG. 5, when the first release film 40 is removed, the protection film 10 is in a state in which it is clearly attached to the screen portion 91.

That is, when the knob portions 22a are 31a are pulled in a state in which the 2-2-th auxiliary film 32 is attached to the screen portion 91 of the smart device 90, the protection film 10 is attached to the screen portion 91 while the 2-2-th auxiliary film 32 being released from the screen portion 91.

In the case in which the protection film structure includes both of the protection film adhesive material 15 and the third adhesive material 25 as in the first exemplary embodiment, it is preferable that adhesion of the third adhesive material 25 is stronger than that of the protection film adhesive material 15. The reason is that in the case in which dust is introduced between the protection film adhesive material and the third adhesive material 25, the dust is strongly adhered to the third adhesive material 25, such that it may be removed together with the first auxiliary film 20 when the first auxiliary film 20 is removed.

According to the first exemplary embodiment, external dust may not be introduced in a process of attaching the protection film 10 to the screen portion 91, and even though a small amount of dust is introduced, the introduced dust is adhered to the adhesive materials (the first adhesive material 60, the second adhesive material 35, and the third adhesive material 25) applied to the first auxiliary film 20 and the second auxiliary film 30, such that it may be removed.

Therefore, the protection film 10 may be easily attached to an accurate position of the screen portion 91 without the introduction of the dust.

The first release film 40 and the second release film may be release films attached, respectively, to opposite sides of the protection film structure according to the first exemplary embodiment.

In the first exemplary embodiment, when the knob portions 22a are 31a are pulled, the knob portions 22a and 31a are pulled while the protection film structure being pressed. In this case, the 1-2-th auxiliary film 22 and the 2-1-th auxiliary film 31 may be manufactured to have widths smaller than those of the 1-1-th auxiliary film 21 and the 2-2-th auxiliary film 32 in order not to hinder force pressing the protection film structure from pulling the knob portions 22a and 31a.

Figure 6:
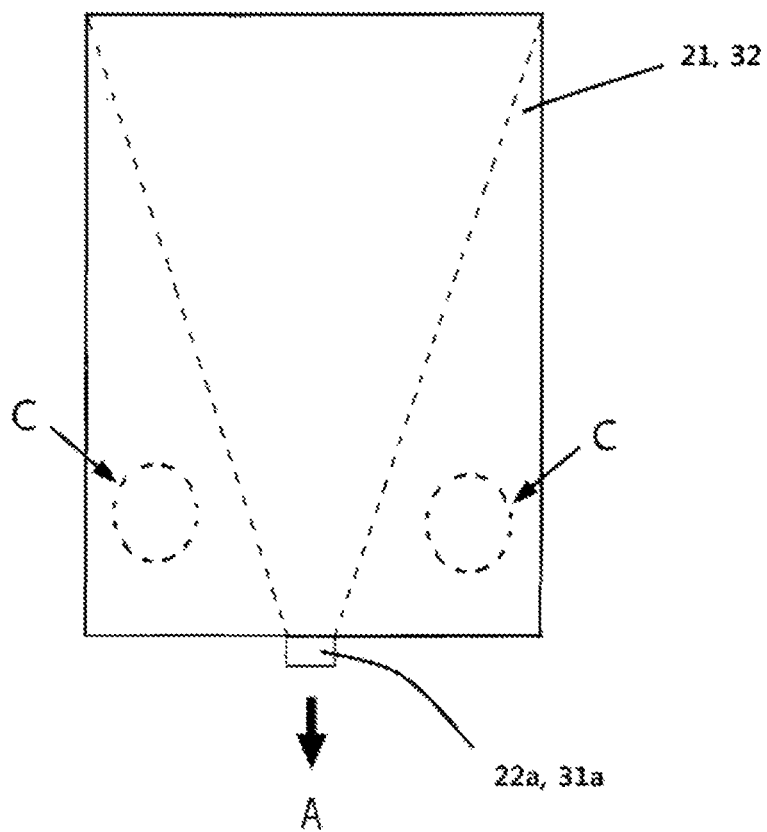
FIG. 6 is a fourth reference drawing of the first exemplary embodiment.

FIG. 6 is a fourth reference drawing of the first exemplary embodiment.

In FIG. 6, the 1-1-th auxiliary film 21 and the 2-2-th auxiliary film 32 have rectangular shapes, but when the 1-2-th auxiliary film 22 and the 2-1-th auxiliary film 31 are manufactured to have the widths smaller than those of the 1-1-th auxiliary film 21 and the 2-2-th auxiliary film 32, as denoted by dotted lines, even though portions C are strongly pressed with fingers, it does not hinder the knob portions 22a and 31a from being pulled in direction A.

Second Exemplary Embodiment

A second exemplary embodiment is an exemplary embodiment in which the protection film is removed from the first exemplary embodiment, and may be called a protection film attachment-assisting structure.

That is, the protection film attachment-assisting structure assists a user to easily attach a commercially available protection film to a screen portion of a smart device (for example, a smartphone).

Figure 7:
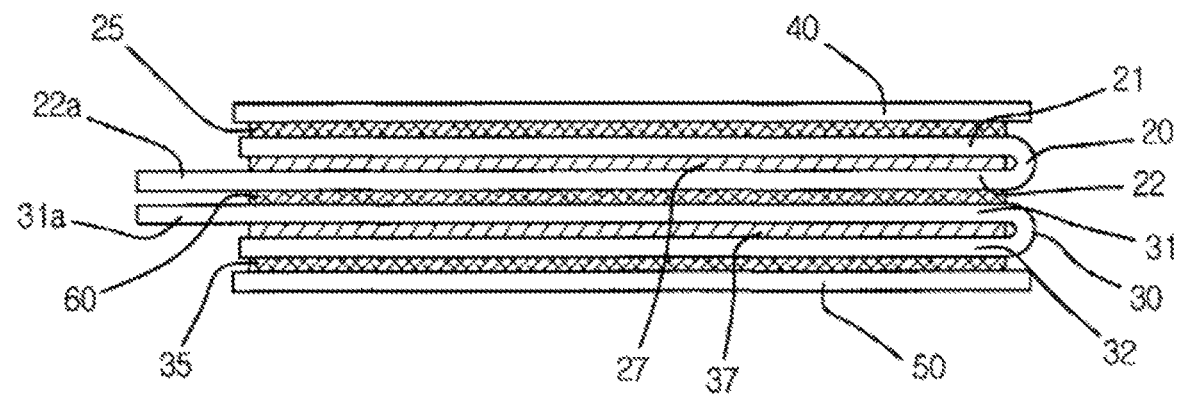
FIG. 7 is a vertical cross-sectional view of a protection film attachment-assisting structure according to a second exemplary embodiment.
Figure 8:
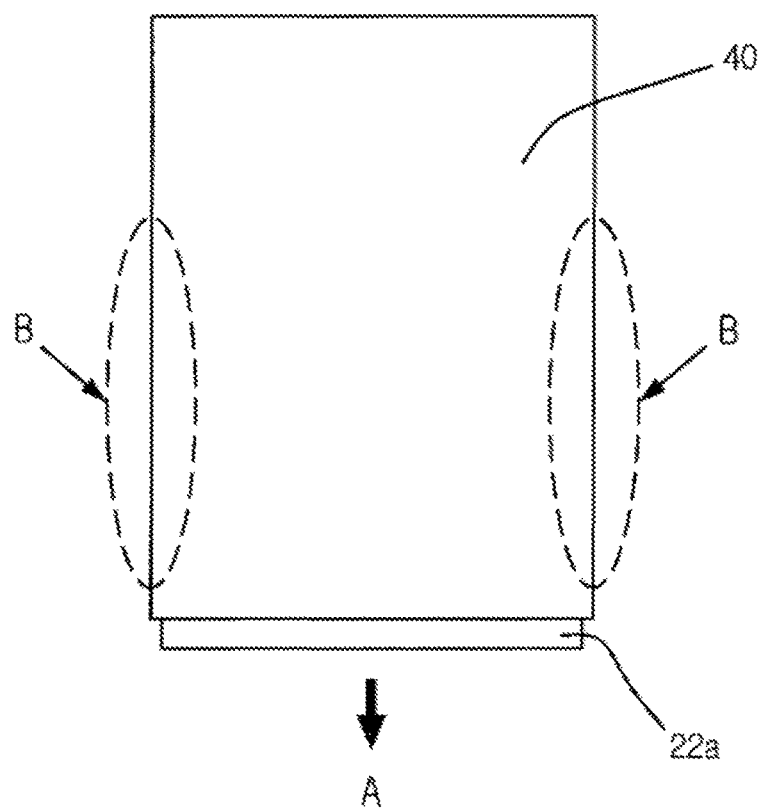
FIG. 8 is a plan view of the protection film attachment-assisting structure according to the second exemplary embodiment.

FIG. 7 is a vertical cross-sectional view of a protection film attachment-assisting structure according to a second exemplary embodiment, and FIG. 8 is a plan view of the protection film attachment-assisting structure according to the second exemplary embodiment.

FIG. 7 of the second exemplary embodiment illustrates a form in which the protection film 10, the fourth adhesive material 45, and the protection film adhesive material 15 are omitted from FIG. 1 of the first exemplary embodiment.

A method of using the protection film attachment-assisting structure according to the second exemplary embodiment is as follows.

First, the second release film 50 is removed, and the remaining portion of the protection film attachment-assisting structure is then attached to the screen portion of the smart device (for example, the smartphone). Then, the first release film 40 is removed, and a commercially available protection film is then attached onto the first auxiliary film.

Then, when the knob portions 22a are 31a are pulled while the protection film attachment-assisting structure being pressed from above, the protection film is attached to the screen portion 91 while the 1-1-th auxiliary film 21 being released from the protection film and the 2-2-th auxiliary film 32 being released from the screen portion 91.

The commercially available protection film also has a release film attached thereto, and it is preferable that the release film attached to an upper portion of the protection film is removed after the protection film is attached to the screen portion 91.

When the commercially available protection film is attached onto the first auxiliary film, dust may be introduced between the protection film and the 1-1-th auxiliary film 21. In order to remove the dust, it is preferable that adhesion of the third adhesive material 25 applied to a surface of the 1-1-th auxiliary film in contact with the protection film is stronger than that of an adhesive material applied to the protection film. The reason is that when the adhesion of the third adhesive material 25 is stronger than that of the adhesive material applied to the protection film, the dust is adhered to the third adhesive material 25, such that it may be removed together with the first auxiliary film 20 when the first auxiliary film 20 is removed.

According to the second exemplary embodiment, external dust may not be introduced in a process of attaching the protection film to the screen portion 91, and even though a small amount of dust is introduced, the introduced dust is adhered to the adhesive materials (the first adhesive material 60, the second adhesive material 35, and the third adhesive material 25) applied to the first auxiliary film 20 and the second auxiliary film 30, such that it may be removed.

Therefore, the protection film may be easily attached to an accurate position of the screen portion 91 without the introduction of the dust.

Also in the second exemplary embodiment, when the knob portions 22a are 31a are pulled, the knob portions 22a and 31a are pulled while the protection film structure being pressed. In this case, the 1-2-th auxiliary film 22 and the 2-1-th auxiliary film 31 may be manufactured to have widths smaller than those of the 1-1-th auxiliary film 21 and the 2-2-th auxiliary film 32 in order not to hinder force pressing the protection film structure from pulling the knob portions 22a and 31a.

Third Exemplary Embodiment

Figure 9:
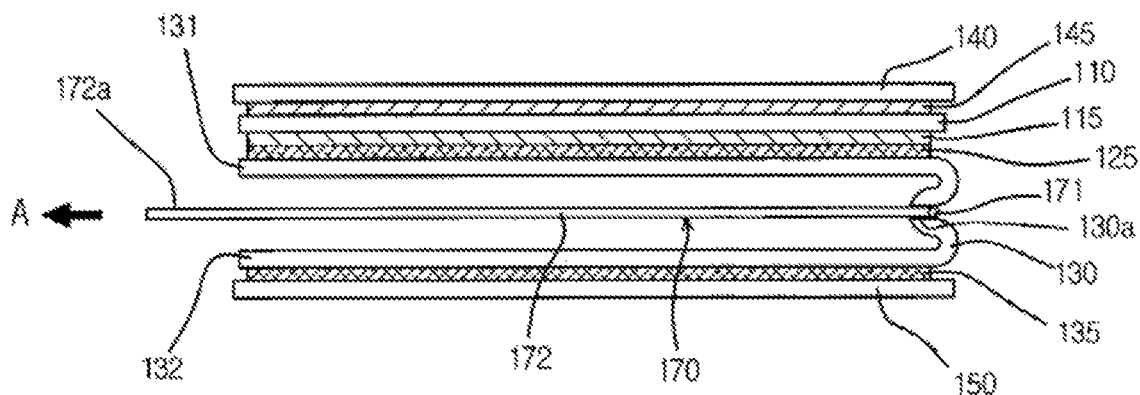
FIG. 9 is a vertical cross-sectional view of a protection film structure according to a third exemplary embodiment.
Figure 10:
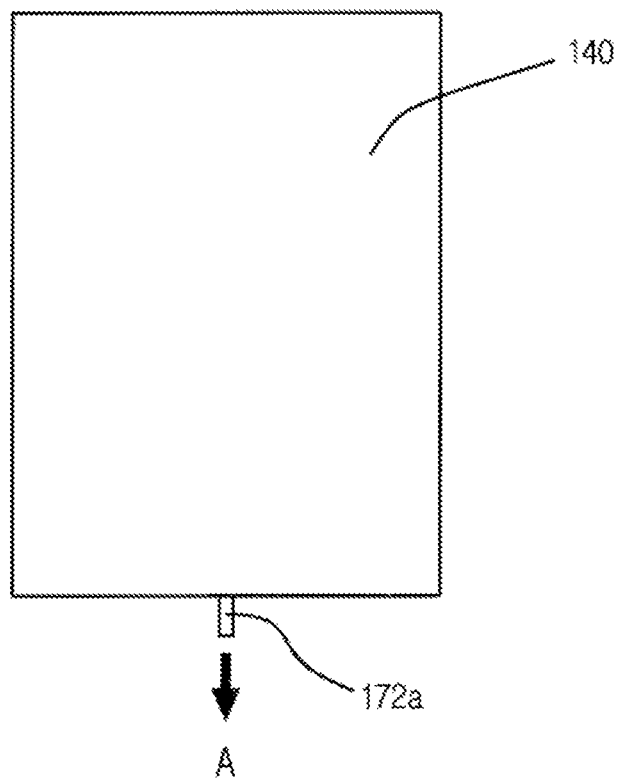
FIG. 10 is a plan view of the protection film structure according to the third exemplary embodiment.
Figure 11:
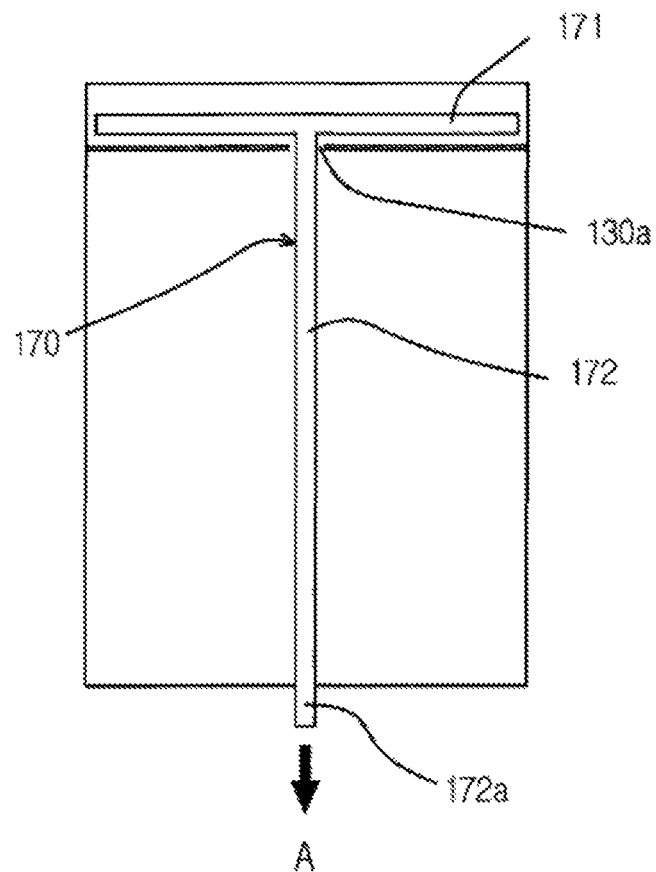
FIG. 11 is a plan perspective view of the protection film structure according to the third exemplary embodiment.

FIG. 9 is a vertical cross-sectional view of a protection film structure according to a third exemplary embodiment, FIG. 10 is a plan view of the protection film structure according to the third exemplary embodiment, and FIG. 11 is a plan perspective view of the protection film structure according to the third exemplary embodiment.

The protection film structure according to the third exemplary embodiment includes an upper release film 140, a protection film 110, an auxiliary film 130 in contact with a lower portion of the protection film, and a second release film 150.

In the auxiliary film 130, an upper auxiliary film 131 and a lower auxiliary film 132 are overlapped with and connected to each other, and an M-shaped wrinkle is formed at a connection portion between the upper auxiliary film 131 and the lower auxiliary film 132.

A pulling rod is attached to a central portion of the M-shaped wrinkle.

A pulling member 170 includes the pulling rod 171 and a pulling connection portion 172, the pulling connection portion 172 is connected to the pulling rod 171, and a pulling member knob portion 172*a* is formed at the other end portion of the pulling connection portion 172.

Therefore, when the pulling member knob portion 172*a* is pulled, the central portion of the M-shaped wrinkle is pulled, and the M-shaped wrinkle is deepened.

As illustrated in FIG. 9, in the case in which the auxiliary film 130 is positioned between the pulling member knob portion 172*a* and the pulling rod 171, an auxiliary film hole 130*a* needs to be formed in the auxiliary film 130 so as to allow the pulling connection portion 172 to pass through the auxiliary film.

When the pulling rod 171 is attached to a surface, facing the pulling member knob portion 172*a*, of two surfaces of the auxiliary film 130, the auxiliary film hole 130*a* does not need to be formed.

The pulling rod 171 and the pulling connection portion 172 may be made of various materials having plastic, a metal, paper, and the like, having a predetermined strength.

In the pulling member of FIGS. 9 and 11, the pulling connection portion 172 is vertically connected to a central portion of the pulling rod 171, such that the pulling member has a T shape.

However, the pulling member may also not have the T shape. For example, pulling connection portions may also be formed at both ends of the pulling rod 171, respectively.

In FIG. 9, the upper release film 140, the upper auxiliary film 131, the pulling member 170, the lower auxiliary film 132, and the second release film 150 may be sequentially stacked while being in contact with each other.

An upper release film adhesive material 145 is applied to a lower portion of the upper release film 140, and a protection film adhesive material 115 is applied to the lower portion of the protection film 110.

An upper adhesive material 125 is applied to an upper portion of the upper auxiliary film 131, and a lower adhesive material 135 is applied to a lower portion of the lower auxiliary film 132.

It is preferable that edges of the upper auxiliary film 131 and edges of the lower auxiliary film 132 are bonded to each other. When the edges of the upper auxiliary film 131 and the edges of the lower auxiliary film 132 are bonded to each other, there is an advantage that relative positions of the upper auxiliary film 131 and the lower auxiliary film 132 are fixed.

The edges of the upper auxiliary film 131 and the edges of the lower auxiliary film 132 may be bonded to each other using an adhesive or may be bonded to each other by applying heat to the edges of the upper auxiliary film 131 and the edges of the lower auxiliary film 132 to melt the edges of the upper auxiliary film 131 and the edges of the lower auxiliary film 132. The edges of the upper auxiliary film 131 and the edges of the lower auxiliary film 132 may be bonded to each other by various methods other than the methods described above.

Even though the edges of the upper auxiliary film 131 and the edges of the lower auxiliary film 132 are bonded to each other, it is preferable that only two edges of each of the upper auxiliary film 131 and the lower auxiliary film 132 formed in parallel with a direction in which the pulling member knob portion 172*a* is pulled among four edges of each of the upper auxiliary film 131 and the lower auxiliary film 132 are bonded to each other in order not to hinder the pulling member knob portion 172*a* from being pulled in direction A.

In addition, since the bonding is weak, when the pulling member knob portion 172*a* is continuously pulled in direction A, the bonding (bonding between the edges of the upper auxiliary film 131 and the edges of the lower auxiliary film 132) is released.

In order to use the protection film structure according to the third exemplary embodiment, first, the lower release film 150 is removed, and the remaining portion of the protection film structure is then attached to a screen portion of a smart device (for example, a smartphone).

Then, when the pulling member knob portion 172*a* is pulled while the protection film structure being weakly pressed from above, a lower surface of the protection film 110 is attached to the screen portion while the auxiliary film 130 being removed.

Then, when the upper release film 140 is removed, the protection film 110 is in a state in which it is clearly attached to the screen portion.

That is, when the pulling member knob portion 172*a* is pulled in a state in which the lower auxiliary film 132 is attached to the screen portion of the smart device, the protection film 110 is attached to the screen portion simultaneously with the release of the lower auxiliary film 132 from the screen portion while the M-shaped wrinkle being deepened.

In the case in which the protection film structure includes both of the protection film adhesive material 115 and the upper adhesive material 125 as in the third exemplary embodiment, it is preferable that adhesion of the upper adhesive material 125 is stronger than that of the protection film adhesive material 115. The reason is that in the case in which dust is introduced between the protection film adhesive material 115 and the upper adhesive material 125, the dust is strongly adhered to the upper adhesive material 125, such that it may be removed together with the upper auxiliary film 131 when the upper auxiliary film 131 is removed.

According to the third exemplary embodiment, external dust may not be introduced in a process of attaching the protection film 110 to the screen portion, and even though a small amount of dust is introduced, the introduced dust is adhered to the adhesive materials (the upper adhesive material 125 and the lower adhesive material 135) applied to the auxiliary film 130, such that it may be removed.

Therefore, the protection film 110 may be easily attached to an accurate position of the screen portion without the introduction of the dust.

The upper release film 140 and the lower release film 150 may be release films attached, respectively, to opposite sides of the protection film structure according to the third exemplary embodiment.

A lubricant material may be applied between the upper auxiliary film 131 and the lower auxiliary film 132. In the case in which the lubricant material is applied between the upper auxiliary film 131 and the lower auxiliary film 132, when the pulling member knob portion 172*a* is pulled to remove the auxiliary film 130, friction is decreased, such that the pulling member knob portion 172*a* may be easily pulled.

Fourth Exemplary Embodiment

A fourth exemplary embodiment is an exemplary embodiment in which the protection film is removed from the third exemplary embodiment, and may be called a protection film attachment-assisting structure.

That is, the protection film attachment-assisting structure assists a user to easily attach a commercially available protection film to a screen portion of a smart device (for example, a smartphone).

Figure 12:
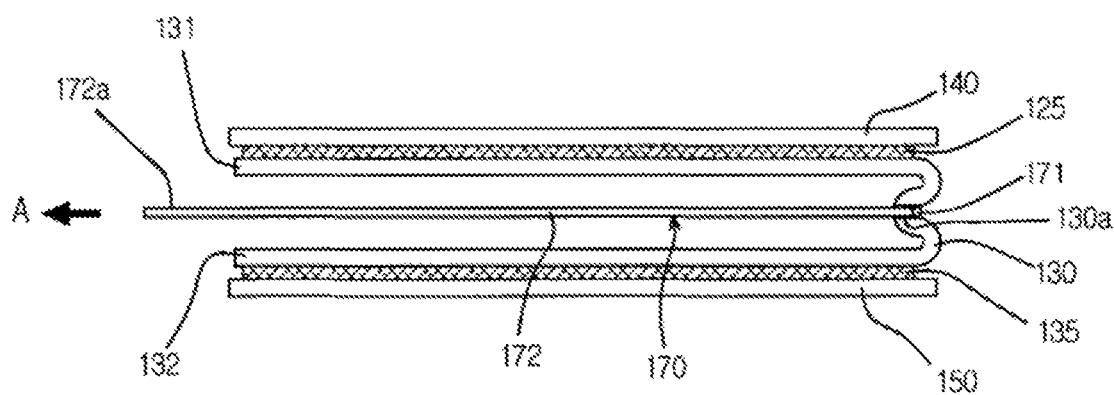
FIG. 12 is a vertical cross-sectional view of a protection film attachment-assisting structure according to a fourth exemplary embodiment.
Figure 13:
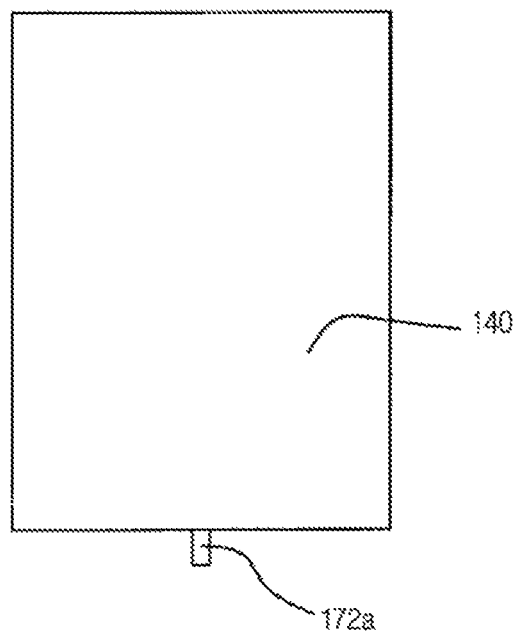
FIG. 13 is a plan view of the protection film attachment-assisting structure according to the fourth exemplary embodiment.

FIG. 12 is a vertical cross-sectional view of a protection film attachment-assisting structure according to a fourth exemplary embodiment, and FIG. 13 is a plan view of the protection film attachment-assisting structure according to the fourth exemplary embodiment.

FIG. 12 of the fourth exemplary embodiment illustrates a form in which the protection film 110, the upper release film adhesive material 145, and the protection film adhesive material 115 are omitted from FIG. 9 of the third exemplary embodiment.

A method of using the protection film attachment-assisting structure according to the fourth exemplary embodiment is as follows.

First, the lower release film 150 is removed, and the remaining portion of the protection film attachment-assisting structure is then attached to the screen portion of the smart device (for example, the smartphone). Then, the upper release film 140 is removed, and a commercially available protection film is then attached onto the upper auxiliary film.

Then, when the pulling member knob portion 172a is pulled, the protection film is attached to the screen portion while the upper auxiliary film 131 being released from the protection film and the lower auxiliary film 132 being released from the screen portion.

The commercially available protection film also has a release film attached thereto, and it is preferable that the release film attached to an upper portion of the protection film is removed after the protection film is attached to the screen portion of the smart device.

When the commercially available protection film is attached onto the upper auxiliary film, dust may be introduced between the protection film and the upper auxiliary film 131. In order to remove the dust, it is preferable that adhesion of the upper adhesive material 125 is stronger than that of an adhesive material applied to the protection film. The reason is that when the adhesion of the upper adhesive material 125 is stronger than that of the adhesive material applied to the protection film, the dust is adhered to the upper adhesive material 125, such that it may be removed together with the auxiliary film 130 when the auxiliary film 130 is removed.

According to the fourth exemplary embodiment, external dust may not be introduced in a process of attaching the protection film to the screen portion 91, and even though a small amount of dust is introduced, the introduced dust is adhered to the adhesive materials (the upper adhesive material 125 and the lower adhesive material 135) applied to the auxiliary film 130, such that it may be removed.

Therefore, the protection film may be easily attached to an accurate position of the screen portion of the smart device without the introduction of the dust.

Fifth Exemplary Embodiment

Figure 14:
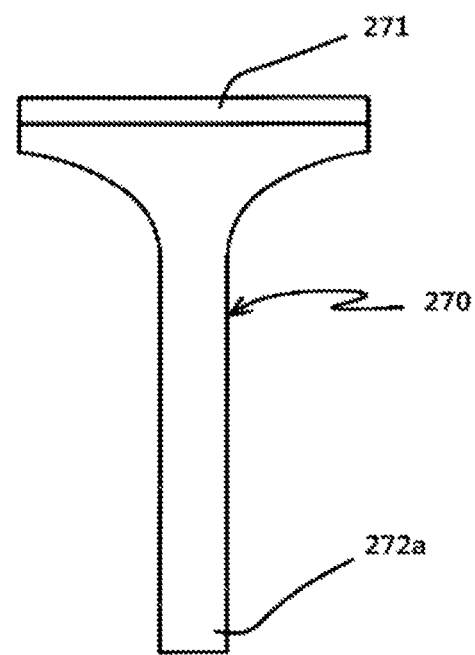
FIG. 14 is a plan view of a pulling member according to a fifth exemplary embodiment.
Figure 15:
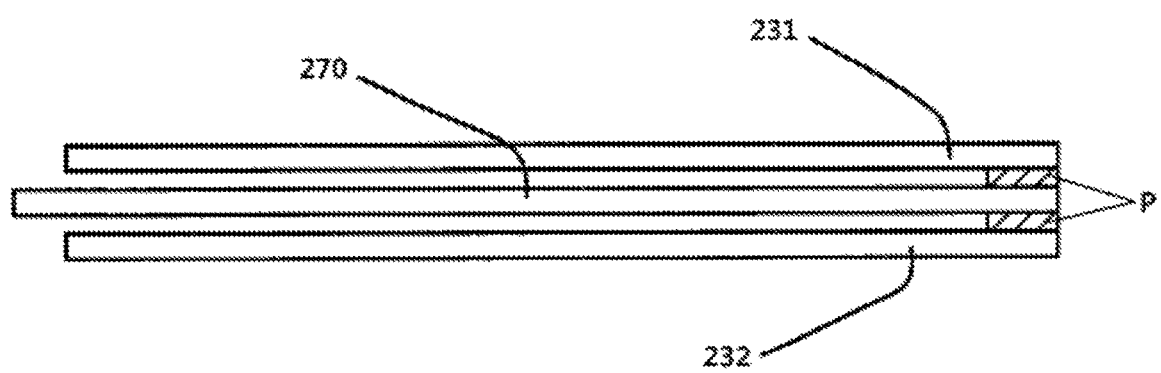
FIG. 15 is a cross-sectional view of an assembly of an upper auxiliary film, the pulling member, and a lower auxiliary film according to the fifth exemplary embodiment.
Figure 16:
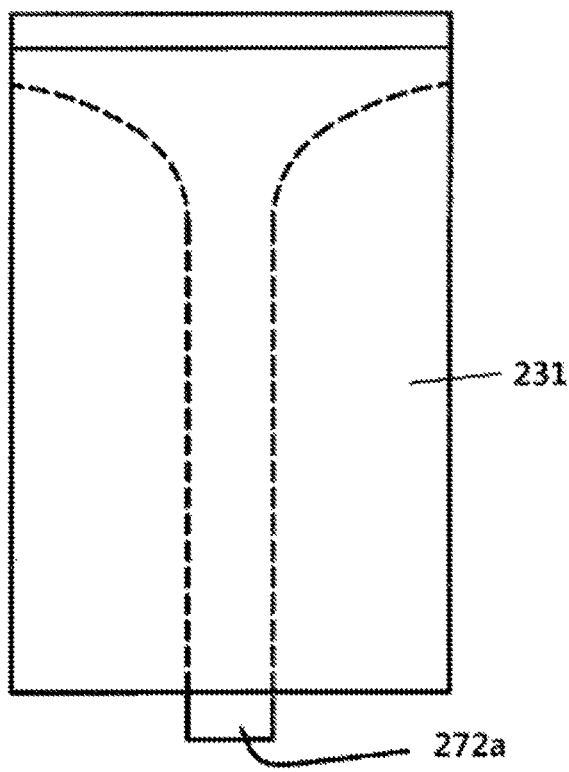
FIG. 16 is a plan view of the assembly of the upper auxiliary film, the pulling member, and the lower auxiliary film according to the fifth exemplary embodiment.

FIG. 14 is a plan view of a pulling member according to a fifth exemplary embodiment, FIG. 15 is a cross-sectional view of an assembly of an upper auxiliary film, the pulling member, and a lower auxiliary film according to the fifth exemplary embodiment, and FIG. 16 is a plan view of the assembly of the upper auxiliary film, the pulling member, and the lower auxiliary film according to the fifth exemplary embodiment.

A pulling member adhesion portion 271 for being attached to an upper auxiliary film and a lower auxiliary film is formed on one end of the pulling member 270, and a pulling member knob portion 272a is formed at the other end of the pulling member 270.

As illustrated in FIG. 15, one end of the upper auxiliary film, one end (the pulling member adhesion portion) of the pulling member, and one end of the lower auxiliary film are sequentially overlapped with each other and are then adhered and connected to each other. In this case, as illustrated in FIG. 15, one end of the upper auxiliary film, one end (the pulling member adhesion portion) of the pulling member, and one end of the lower auxiliary film may be adhered to each other by adhesives P or be adhered to each other by applying heat and then applying pressure to one end of the upper auxiliary film, one end (the pulling member adhesion portion) of the pulling member, and one end of the lower auxiliary film without using the adhesives.

The assembly of the upper auxiliary film, the pulling member, and the lower auxiliary film as illustrated in FIG. 5 may be called an auxiliary film.

A protection film structure according to the fifth exemplary embodiment includes a protection film attached to a screen portion of a smart device and an auxiliary film in contact with a lower portion of the protection film.

Figure 17:
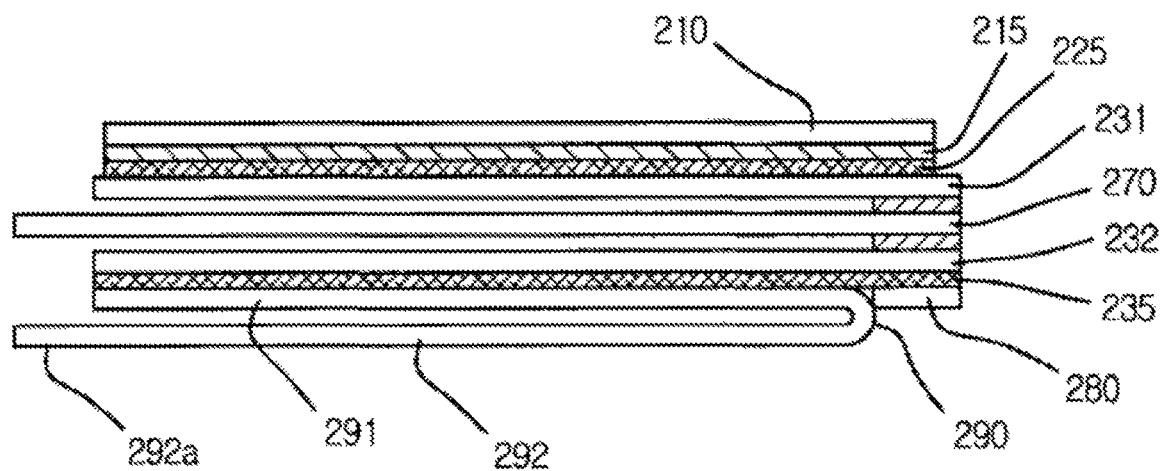
FIG. 17 is a vertical cross-sectional view of a protection film structure according to the fifth exemplary embodiment.

FIG. 17 is a vertical cross-sectional view of a protection film structure according to the fifth exemplary embodiment.

The protection film structure of FIG. 17 may include a protection film 210, an auxiliary film in contact with a lower portion of the protection film, and a first position aligning film 280 and a second position aligning film 290 attached to a lower portion of the auxiliary film.

The first position aligning film 280 is attached to an end portion of a lower auxiliary film 232 at a predetermined area, and an attached portion of the first position aligning film 280 is positioned at a portion corresponding to a portion at which an upper auxiliary film and the lower auxiliary film are connected to each other.

The second position aligning film 290 includes an upper position aligning film 291 and a lower position aligning film 292, the upper position aligning film 291 and the lower position aligning film 292 are connected to each other, the upper position aligning film 291 is attached to the lower auxiliary film 232 so that a connection portion between the upper position aligning film 291 and the lower position aligning film 292 becomes a position in contact with the first position aligning film, and a lower position aligning film knob portion 292a is formed in the lower position aligning film 292.

In the case in which it is assumed that a surface of the lower auxiliary film adhered to the first position aligning film 280 is a first adhesion surface and a surface of the lower auxiliary film adhered to the second position aligning film 290 is a second adhesion surface, When the lower position aligning film knob portion 292a is pulled in a state in which the first adhesion surface of the lower auxiliary film is attached to the screen portion of the smart device, the upper position aligning film 291 is released from the lower auxiliary film 232.

A lower adhesive material 235 is applied to a lower portion of the lower auxiliary film 232.

An upper adhesive material 225 is applied to an upper surface of the upper auxiliary film 231, and a protection film adhesive material 215 is applied to the protection film 210.

In the case in which the protection film structure includes both of the protection film adhesive material 215 and the upper adhesive material 225 as illustrated in FIG. 17, it is preferable that adhesion of the upper adhesive material 225 is stronger than that of the protection film adhesive material 215. The reason is that in the case in which dust is introduced between the protection film adhesive material 215 and the upper adhesive material 225, the dust is strongly adhered to the upper adhesive material 225, such that it may be removed together with the upper auxiliary film 231 when the upper auxiliary film 231 is removed.

It is preferable that edges of the upper auxiliary film 231 and edges of the lower auxiliary film 232 are bonded to each other. When the edges of the upper auxiliary film 231 and the edges of the lower auxiliary film 232 are bonded to each other, there is an advantage that relative positions of the upper auxiliary film 231 and the lower auxiliary film 232 are fixed.

The edges of the upper auxiliary film 231 and the edges of the lower auxiliary film 232 may be bonded to each other using an adhesive or may be bonded to each other by applying heat to the edges of the upper auxiliary film 231 and the edges of the lower auxiliary film 232 to melt the edges of the upper auxiliary film 231 and the edges of the lower auxiliary film 232. The edges of the upper auxiliary film 231 and the edges of the lower auxiliary film 232 may be bonded to each other by various methods other than the methods described above.

Even though the edges of the upper auxiliary film 231 and the edges of the lower auxiliary film 232 are bonded to each other, it is preferable that only two edges of each of the upper auxiliary film 231 and the lower auxiliary film 232 formed in parallel with a direction in which the pulling member knob portion 272a is pulled among four edges of each of the upper auxiliary film 231 and the lower auxiliary film 232 are bonded to each other in order not to hinder the pulling member knob portion 272a from being pulled.

In addition, since the bonding is weak, when the pulling member knob portion 272a is continuously pulled, the bonding (bonding between the edges of the upper auxiliary film 231 and the edges of the lower auxiliary film 232) is released.

In addition, it is preferable that the two edges formed in parallel with the direction in which the pulling member knob portion is pulled are not entirely bonded to each other, but portions of the edges that start to be rolled in (portions that start to be rolled in when the pulling member knob portion is pulled, that is, upper portions of the two edges (left and right edges) in FIG. 2) are not bonded to each other. This is so as not to hinder the portions of the edges from being rolled in when the portions of the edges start to be rolled in by pulling the pulling member knob portion. That is, it is preferable that portions positioned on an opposite side to the pulling member knob portion, of the two edges formed in parallel with the direction in which the pulling member knob portion is pulled are not bonded to each other by a predetermined length.

The surface of the lower auxiliary film adhered to the first position aligning film may be the first adhesion surface and the surface of the lower auxiliary film adhered to the second position aligning film may be the second adhesion surface.

In order to use the protection film structure according to the first exemplary embodiment, first, the first position aligning film 280 is removed, and the first adhesion surface is then attached to the screen portion of the smart device (for example, the smartphone).

Then, when the lower position aligning film knob portion 292a is pulled, the second adhesion surface is attached to the screen portion of the smart device (for example, the smartphone) while the upper position aligning film 291 being released from the lower auxiliary film 232.

Then, when the pulling member knob portion 272a is pulled while the protection film structure being weakly pressed from above, a lower surface of the protection film 210 is attached to the screen portion while the auxiliary film being removed.

That is, when the pulling member knob portion 272a is pulled in a state in which the lower auxiliary film 232 is attached to the screen portion of the smart device, the protection film 210 is attached to the screen portion simultaneously with the release of the lower auxiliary film 232 while portions at which the upper auxiliary film 231 and the lower auxiliary film 232 are bonded and connected to each other being rolled in between the upper auxiliary film 231 and the lower auxiliary film 232.

The protection film 210 is attached to the screen portion while the lower auxiliary film 232 being released from the screen portion.

According to the fifth exemplary embodiment, external dust may not be introduced in a process of attaching the protection film 210 to the screen portion, and even though a small amount of dust is introduced, the introduced dust is adhered to the adhesive materials (the upper adhesive material 225 and the lower adhesive material 235) applied to the auxiliary film, such that it may be removed.

Therefore, the protection film 210 may be easily attached to an accurate position of the screen portion without the introduction of the dust.

The protection film structure according to the fifth exemplary embodiment may further include a release film attached to an upper portion of the protection film 210.

Sixth Exemplary Embodiment

A sixth exemplary embodiment is an exemplary embodiment in which the protection film is removed from the fifth exemplary embodiment, and may be called a protection film attachment-assisting structure.

That is, the protection film attachment-assisting structure assists a user to easily attach a commercially available protection film to a screen portion of a smart device (for example, a smartphone).

Figure 18:
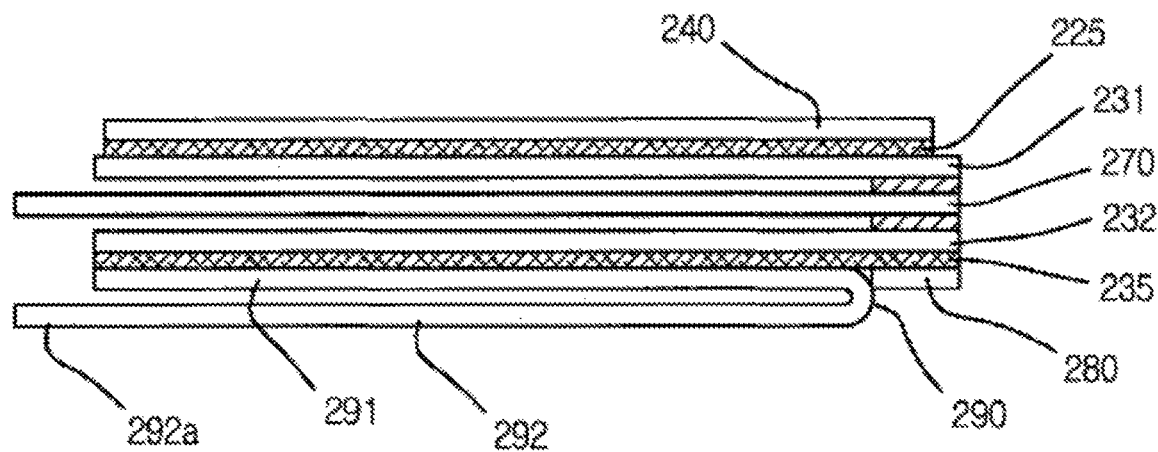
FIG. 18 is a vertical cross-sectional view of a protection film attachment-assisting structure according to a sixth exemplary embodiment.

FIG. 18 is a vertical cross-sectional view of a protection film attachment-assisting structure according to a sixth exemplary embodiment.

In FIG. 18 of the sixth exemplary embodiment, the protection film 210 and the protection film adhesive material 215 are omitted from FIG. 17 of the fifth exemplary embodiment and an upper release film 240 is added to FIG. 17 of the fifth exemplary embodiment.

A portion of the upper release film 240 may be bonded to a portion of the upper auxiliary film 231 by heat and pressure applied thereto.

It is preferable that edges of the upper auxiliary film 231 and edges of the lower auxiliary film 232 are bonded to each other. When the edges of the upper auxiliary film 231 and the edges of the lower auxiliary film 232 are bonded to each other, there is an advantage that relative positions of the upper auxiliary film 231 and the lower auxiliary film 232 are fixed.

The edges of the upper auxiliary film 231 and the edges of the lower auxiliary film 232 may be bonded to each other using an adhesive or may be bonded to each other by applying heat to the edges of the upper auxiliary film 231 and the edges of the lower auxiliary film 232 to melt the edges of the upper auxiliary film 231 and the edges of the lower auxiliary film 232. The edges of the upper auxiliary film 231 and the edges of the lower auxiliary film 232 may be bonded to each other by various methods other than the methods described above.

Even though the edges of the upper auxiliary film 231 and the edges of the lower auxiliary film 232 are bonded to each other, it is preferable that only two edges of each of the upper auxiliary film 231 and the lower auxiliary film 232 formed in parallel with a direction in which the pulling member knob portion 272a is pulled among four edges of each of the upper auxiliary film 231 and the lower auxiliary film 232 are bonded to each other in order not to hinder the pulling member knob portion 272a from being pulled.

In addition, since the bonding is weak, when the pulling member knob portion 272a is continuously pulled, the bonding (bonding between the edges of the upper auxiliary film 231 and the edges of the lower auxiliary film 232) is released.

The surface of the lower auxiliary film 232 adhered to the first position aligning film 280 may be the first adhesion surface and the surface of the lower auxiliary film 232 adhered to the second position aligning film 290 may be the second adhesion surface.

A method of using the protection film attachment-assisting structure according to the sixth exemplary embodiment is as follows.

First, the upper release film 240 is separated from the upper auxiliary film 231, and the protection film is attached to an upper portion of the upper auxiliary film 231.

Then, the first position aligning film 280 is removed, and the first adhesion surface is then attached to the screen portion of the smart device (for example, the smartphone).

Then, when the lower position aligning film knob portion 292a is pulled, the second adhesion surface is attached to the screen portion of the smart device (for example, the smartphone) while the upper position aligning film 291 being released from the lower auxiliary film 232.

Then, when the pulling member knob portion 272a is pulled while the protection film attachment-assisting structure being weakly pressed from above, a lower surface of the protection film is attached to the screen portion while the auxiliary film being removed.

That is, when the pulling member knob portion 272a is pulled in a state in which the lower auxiliary film 232 is attached to the screen portion of the smart device, the protection film 210 is attached to the screen portion simultaneously with the release of the lower auxiliary film 232 while portions at which the upper auxiliary film 231 and the lower auxiliary film 232 are bonded and connected to each other being rolled in between the upper auxiliary film 231 and the lower auxiliary film 232.

According to the sixth exemplary embodiment, external dust may not be introduced in a process of attaching the protection film 210 to the screen portion, and even though a small amount of dust is introduced, the introduced dust is adhered to the adhesive materials (the upper adhesive material 225 and the lower adhesive material 235) applied to the auxiliary film, such that it may be removed.

Therefore, the protection film 210 may be easily attached to an accurate position of the screen portion without the introduction of the dust.

It is preferable that adhesion of the upper adhesive material 225 is stronger than that of an adhesive material applied to the protection film.

When the upper release film 240 is separated from the upper auxiliary film 231, in the case in which a knob portion does not exist, it may be difficult to separate the upper release film 240 from the upper auxiliary film 231.

Figure 19:
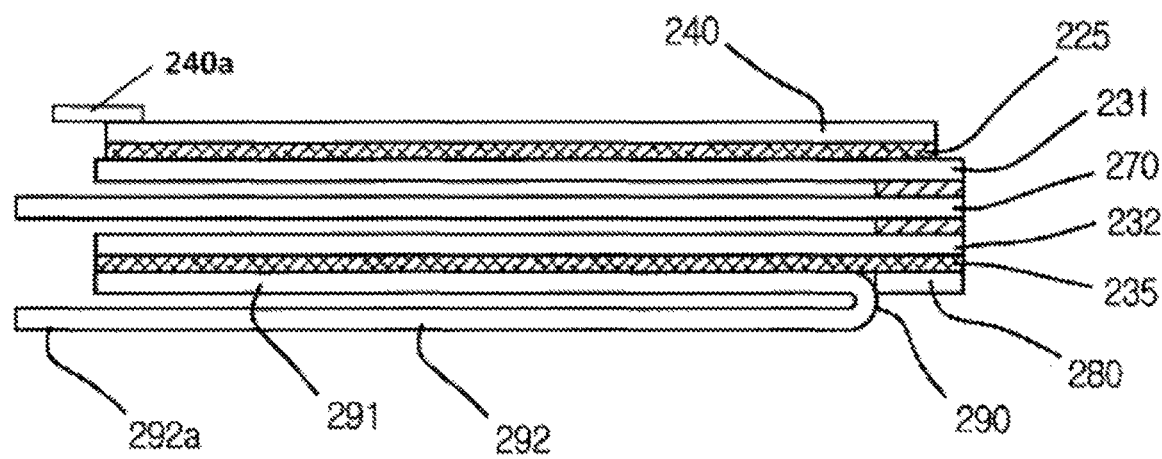
FIG. 19 is a cross-sectional view illustrating a form in which a release film knob portion is formed in the protection film attachment-assisting structure according to the sixth exemplary embodiment.

FIG. 19 is a cross-sectional view illustrating a form in which a release film knob portion is formed in the protection film attachment-assisting structure according to the sixth exemplary embodiment.

As illustrated in FIG. 19, when a release film knob portion 240a is formed in the upper release film 240 of the protection film attachment-assisting structure, the upper release film 240 may be easily separated from the upper auxiliary film 231 by holding and then pulling the release film knob portion 240a.

In the fifth and sixth exemplary embodiments, a knob portion may also be formed in the first position aligning film 280 in order to easily remove the first position aligning film 280 when the first position aligning film 280 is removed.

Figure 20:
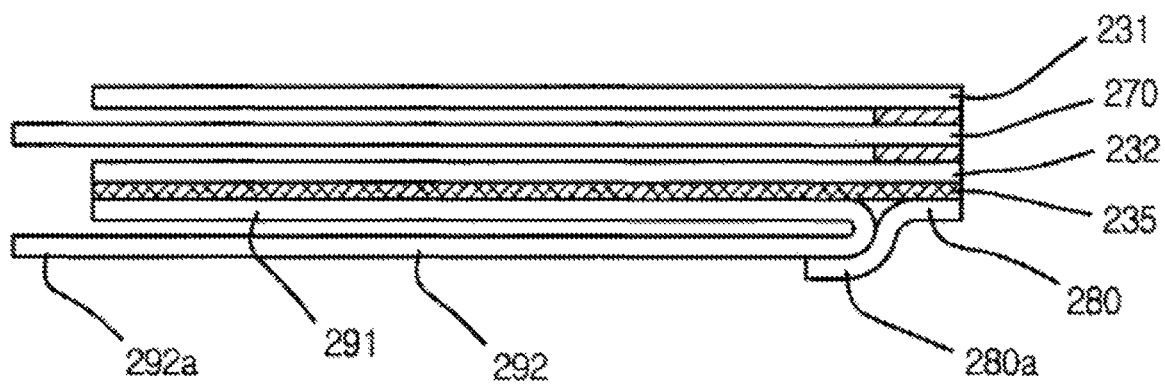
FIG. 20 is a cross-sectional view illustrating a form in which a first position aligning film knob portion is formed.

FIG. 20 is a cross-sectional view illustrating a form in which a first position aligning film knob portion is formed.

As illustrated in FIG. 20, when the first position aligning film knob portion 280a is formed in the first position aligning film 280, the first position aligning film 280 may be easily removed by a method of pulling the first position aligning film knob portion 280a.

Although the first position aligning film knob portion 280a is formed in a direction toward the second position aligning film 290 in FIG. 20, the first position aligning film knob portion 280a may also be formed in an opposite direction to the direction described above or other directions.

In the second to sixth exemplary embodiments as in the first exemplary embodiment, when two edges formed in parallel with the direction in which the (pulling member) knob portion is pulled are bonded to each other, it is preferable that portions positioned on an opposite side to the knob portion, of the two edges formed in parallel with the direction in which the knob portion is pulled are not bonded to each other by a predetermined length.

Although the protection film structures and the protection film attachment-assisting structures are very thickly illustrated in FIGS. 1, 7, 9, 12, and 17 to 19, they are exaggerated for convenient understanding, and are very thinly manufactured in fact.

The invention claimed is:
1. A protection film attachment-assisting structure comprising:
an upper auxiliary film;
a lower auxiliary film;
a pulling member positioned between the upper auxiliary film and the lower auxiliary film;
a first adhesive located between the pulling member and the upper auxiliary film; and
a second adhesive located between the pulling member and the lower auxiliary film,
wherein the upper auxiliary film, the pulling member, and the lower auxiliary film are separated layers each other and sequentially overlapped with each other,
the first adhesive attaches one end of the upper auxiliary film to one end of the pulling member,
the second adhesive attaches one end of the lower auxiliary film to one end of the pulling member,
a pulling member knob portion is formed at the other end portion of the pulling member and is able to be pulled,
a lower adhesive material is directly attached to a bottom surface of the lower auxiliary film, and the upper auxiliary film, the lower auxiliary film, and the pulling member are configured such that when the pulling member knob portion is pulled in a state in which the upper auxiliary film is attached to a protection film and the lower auxiliary film is attached to a screen portion of a smart device, the protection film is attached to the screen portion simultaneously with the release of the lower auxiliary film while portions at which the upper auxiliary film and the lower auxiliary film are bonded and connected to each other being rolled in between the upper auxiliary film and the lower auxiliary film and dust on the screen portion is removed by the lower adhesive material.

2. The protection film attachment-assisting structure of claim 1, wherein an upper adhesive material is directly attached to a top surface of the upper auxiliary film, an adhesive material is directly attached to a bottom surface of the protection film, and adhesion force of the upper adhesive material is stronger than that of the adhesive material directly attached to the protection film.

3. The protection film attachment-assisting structure of claim 1, further comprising a first position aligning film and a second position aligning film attached to the lower auxiliary film,
wherein the first position aligning film is attached to an end portion of the lower auxiliary film at a predetermined area, and an attached portion of the first position aligning film is positioned at a portion corresponding to a portion at which the upper auxiliary film and the lower auxiliary film are connected to each other,
the second position aligning film includes an upper position aligning film and a lower position aligning film, the upper position aligning film and the lower position aligning film are connected to each other, the upper position aligning film is attached to the lower auxiliary film so that a connection portion between the upper position aligning film and the lower position aligning film becomes a position in contact with the first position aligning film, and a lower position aligning film knob portion is formed in the lower position aligning film, and
in the case in which it is assumed that a surface of the lower auxiliary film adhered to the first position aligning film is a first adhesion surface and a surface of the lower auxiliary film adhered to the second position aligning film is a second adhesion surface,
when the lower position aligning film knob portion is pulled in a state in which the first adhesion surface of the lower auxiliary film is attached to the screen portion of the smart device, the upper position aligning film is released from the lower auxiliary film.

4. The protection film attachment-assisting structure of claim 3, wherein a first position aligning film knob portion is formed in the first position aligning film.

5. The protection film attachment-assisting structure of claim 1, wherein portions of edges of each of the upper auxiliary film and the lower auxiliary film formed in parallel with a direction in which the pulling member knob portion is pulled among edges of the upper auxiliary film and edges of the lower auxiliary film are bonded to each other.

6. The protection film attachment-assisting structure of claim 1, wherein a release film is attached to the upper auxiliary film.

7. The protection film attachment-assisting structure of claim 6, wherein a release film knob portion is formed in the release film.

8. A protection film structure comprising:
a protection film; and
an auxiliary film in contact with a lower portion of the protection film,
wherein,
the auxiliary film includes an upper auxiliary film, a lower auxiliary film, a pulling member positioned between the upper auxiliary film and the lower auxiliary film, a first adhesive located between the pulling member and the upper auxiliary film, and a second adhesive located between the pulling member and the lower auxiliary film,
the upper auxiliary film, the pulling member, and the lower auxiliary film are separated layers from each other and sequentially overlapped with each other,
the first adhesive attaches one end of the upper auxiliary film to one end of the pulling member,
the second adhesive attaches one end of the lower auxiliary film to one end of the pulling member,
a pulling member knob portion is formed at the other end portion of the pulling member and is able to be pulled,
the protection film is in contact with the upper auxiliary film,
a protection film adhesive material is directly attached to a bottom surface of the protection film,
the protection film adhesive material is located between the upper auxiliary film and the protection film,
a lower adhesive material is directly attached to a bottom surface of the lower auxiliary film, and
the protection film and the auxiliary film are configured such that when the pulling member knob portion is pulled in a state in which the lower auxiliary film is attached to the screen portion of the smart device, the protection film is attached to the screen portion simultaneously with the release of the lower auxiliary film while portions at which the upper auxiliary film and the lower auxiliary film are bonded and connected to each other being rolled in between the upper auxiliary film and the lower auxiliary film and dust on the screen portion is removed by the lower adhesive material.

9. The protection film structure of claim 8, wherein an upper adhesive material is directly attached to a top surface of the upper auxiliary film, and adhesion force of the upper adhesive material is stronger than that of the protection film adhesive material.

10. The protection film structure of claim 8, further comprising a first position aligning film and a second position aligning film attached to the lower auxiliary film,
wherein the first position aligning film is attached to an end portion of the lower auxiliary film at a predetermined area, and an attached portion of the first position aligning film is positioned at a portion corresponding to a portion at which the upper auxiliary film and the lower auxiliary film are connected to each other,
the second position aligning film includes an upper position aligning film and a lower position aligning film, the upper position aligning film and the lower position aligning film are connected to each other, the upper position aligning film is attached to the lower auxiliary film so that a connection portion between the upper position aligning film and the lower position aligning film becomes a position in contact with the first position aligning film, and a lower position aligning film knob portion is formed in the lower position aligning film, and
in the case in which it is assumed that a surface of the lower auxiliary film adhered to the first position aligning film is a first adhesion surface and a surface of the lower auxiliary film adhered to the second position aligning film is a second adhesion surface, when the lower position aligning film knob portion is pulled in a state in which the first adhesion surface of the lower auxiliary film is attached to the screen portion of the smart device, the upper position aligning film is released from the lower auxiliary film.

11. The protection film structure of claim 10, wherein a first position aligning film knob portion is formed in the first position aligning film.

12. The protection film structure of claim 8, wherein portions of edges of each of the upper auxiliary film and the lower auxiliary film formed in parallel with a direction in which the pulling member knob portion is pulled among edges of the upper auxiliary film and edges of the lower auxiliary film are bonded to each other.

* * * * *